(12) United States Patent
Kim

(10) Patent No.: US 10,921,908 B2
(45) Date of Patent: Feb. 16, 2021

(54) STYLUS PEN AND METHOD FOR MANUFACTURING THE SAME

(71) Applicant: HiDeep Inc., Seongnam-si (KR)

(72) Inventor: Seyeob Kim, Seongnam-si (KR)

(73) Assignee: HIDEEP INC., Seongnam-si (KR)

( * ) Notice: Subject to any disclaimer, the term of this patent is extended or adjusted under 35 U.S.C. 154(b) by 123 days.

(21) Appl. No.: 15/984,509

(22) Filed: May 21, 2018

(65) Prior Publication Data

US 2019/0179433 A1      Jun. 13, 2019

(30) Foreign Application Priority Data

Dec. 8, 2017   (KR) .................... 10-2017-0168228

(51) Int. Cl.
*G06F 3/0354*     (2013.01)

(52) U.S. Cl.
CPC ................ *G06F 3/03545* (2013.01)

(58) Field of Classification Search
CPC .................................................. G06F 3/03545
See application file for complete search history.

(56) References Cited

U.S. PATENT DOCUMENTS

| 5,491,706 A | 2/1996 | Tagawa et al. |
| 9,298,285 B2 | 3/2016 | Mohindra et al. |
| 2009/0225945 A1* | 9/2009 | Smither ............... G01N 23/046 378/71 |
| 2017/0008332 A1* | 1/2017 | Mattis .................... B43K 29/00 |
| 2017/0199590 A1* | 7/2017 | Lien ..................... G06F 3/03545 |

FOREIGN PATENT DOCUMENTS

| JP | 06-301465 | 10/1994 |
| JP | 2000112645 | 4/2000 |
| KR | 10-2016-0064719 | 6/2016 |
| WO | 2013-057862 | 4/2013 |

\* cited by examiner

*Primary Examiner* — Yaron Cohen
(74) *Attorney, Agent, or Firm* — Lex IP Meister, PLLC

(57) ABSTRACT

A stylus pen includes: a first body with a first opening at one end and a second opening at the other end; a stylus tip, at least part of which protrudes from the first opening and has conductivity; a guide portion attached to the second opening and including a cavity; and a conductive member that extends through the cavity within the first body, with one end attached to the stylus tip, and that is electrically connected to the cavity.

15 Claims, 26 Drawing Sheets

STYLUS PEN AND METHOD FOR MANUFACTURING THE SAME

CROSS-REFERENCE TO RELATED APPLICATION

This application claims priority to and the benefit of Korean Patent Application No. 10-2017-0168228 filed in the Korean Intellectual Property Office on Dec. 8, 2017, the entire contents of which are incorporated herein by reference.

BACKGROUND

(a) Field

The present disclosure relates to a stylus pen and a method for manufacturing the same.

(b) Description of the Related Art

Various mobile terminals such as mobile phones, smartphones, tablet PCs, laptop computers, digital broadcasting terminals, PDAs (Personal Digital Assistants), PMPs (Portable Multimedia Players), and navigation devices come with touch sensors.

Touch sensors in such terminals may be positioned on a display panel that displays images or in an area of the terminal body. The terminal may provide the user with an intuitive user interface, as the user interacts with the terminal by touching the touch sensors.

The user may use a stylus pen for precise touch input. Stylus pens may be divided into active stylus pens and passive stylus pens, depending on whether they include electronic components or not.

FIG. 1 is a view showing a passive stylus pen according to the conventional art. Referring to FIG. 1, a stylus pen 10 includes a bullet-shaped stylus tip 11 and a stylus body 12. The stylus tip 11 is entirely or partially made of a conductive material.

Generally, the user tilts the stylus pen 10 at an angle with respect to a sensing surface 20 when using the stylus pen 10, rather than holding the stylus pen 10 perpendicular to the sensing surface 20. If the user tilts the stylus pen 10 when using it, additional capacitance is formed between the side of the conductive stylus tip 11 and the sensing surface 20. Then, due to the additional capacitance, the largest change in capacitance occurs between a point 21 of contact with the stylus tip 11 and a certain point 22 in the direction in which the stylus pen 10 is tilted. Thus, rather than the point 21 at which the stylus tip 11 makes actual contact with the sensing surface 20, the point 22 adjacent to the point 21 is detected as a contact point. In this case, an offset 23 (hereinafter referred to as the tilt offset) between the actual point 21 of contact and the actual detected point 22 may be as large as several hundreds of micrometers or more.

As such, when a passive stylus pen according to the conventional art is tilted, a linearity error occurs depending on the tilt of the stylus pen, making precise touch input difficult.

U.S. Pat. No. 9,298,285 discloses a stylus pen for solving this problem.

FIG. 2 and FIG. 3 are views showing the structure of the stylus pen disclosed in U.S. Pat. No. 9,298,285.

In FIG. 2, a stylus pen 30 includes a spherical stylus tip 31 and a conductive member 32 connected to the stylus tip 31. Part of the stylus tip 31 and the conductive member 32 are surrounded and fixed by a holder 33 made of a non-conductive material. The holder 33 is connected to a stylus body 34. According to the structure of the stylus pen 30 illustrated in FIG. 2, the largest change in capacitance occurs at a contact point regardless of the tilt because the spherical stylus tip 31 is used, and the change in capacitance caused by the conductive member 32 can be minimized because the conductive member 32 is made thin. Thus, the tilt offset can be minimized.

However, according to the structure of the stylus pen illustrated in FIG. 2 and FIG. 3, the distance between the grip part and the conductive member 32 is large, which makes the capacitance C1 between the user's hand and the conductive member 32 small and causes the conductive member to float, thereby reducing the touch sensitivity of the stylus tip 31.

The above information disclosed in this Background section is only for enhancement of understanding of the background and therefore it may contain information that does not form the prior art that is already known in this country to a person of ordinary skill in the art.

SUMMARY

Exemplary embodiments provide a stylus pen that reduces tilt offset and a method for manufacturing the same.

Exemplary embodiments provide a stylus pen that increases the touch sensitivity of touch sensors and a method for manufacturing the same.

To achieve the above or other aspects, a stylus pen according to an exemplary embodiment is provided, including: a first body with a first opening at one end and a second opening at the other end; a stylus tip, at least part of which protrudes from the first opening and has conductivity; a guide portion attached to the second opening and including a cavity; and a conductive member that extends through the cavity within the first body, with one end attached to the stylus tip, and that is electrically connected to the cavity.

The conductive member may come in contact with the inner surface of the cavity.

The cavity may include a sidewall, and the conductive member may come in contact with the sidewall.

At least a part of the conductive member may be bent within the cavity.

An end of the conductive member that is bent may come in contact with the inner surface of the cavity.

The bent part of the conductive member may come in contact with the sidewall.

The conductive member may be bent at an acute angle, and the length of the part bent at the acute angle may be R/sin a1 or more, where R is the radius of the cavity and a1 is the acute angle.

The conductive member may be bent at an obtuse angle, and the length the part bent at the obtuse angle may be R/cos a1 or more, where R is the radius of the cavity and a1 is the obtuse angle.

The stylus pen may further include a second body that is attached to the guide portion on the opposite side of one end to which the second opening is attached.

The guide portion may further include a first combining portion attached to the first body, a grip part that is externally exposed, and a second combining portion attached to the second body.

The second combining portion may extend within the second body.

The stylus pen may further include a guide extension attached to the cavity, wherein the second body may be attached to the guide portion and the guide extension, and the second body may extend within the second body.

The guide portion may not be externally exposed because of the first body and the second body.

The conductive member may include a metallic material with elasticity.

The conductive member may be 1 mm or less in diameter.

The diameter of the stylus tip may be 0.5 mm to 3 mm, and the diameter of the first opening may be smaller than the diameter of the stylus tip.

A part of the conductive member attached to the stylus tip may have a different shape than the other part of the conductive member so as to keep the conductive member from being separated from the stylus tip.

A method for manufacturing a stylus pen according to another exemplary embodiment includes: inserting a conductive member with a stylus tip attached thereto into a first opening of a first body; bending a part of the conductive member inserted in the first opening; and inserting a part of the conductive member into a cavity of a guide portion.

A stylus pen according to yet another exemplary embodiment includes: a stylus tip with conductivity and that is 0.5 mm to 3 mm in diameter; a conductive member measuring 20 mm or more in length, with one end attached to the stylus tip; and a guide portion with conductivity that includes a cavity with the conductive member inserted therein, wherein the other end of the conductive member come in contact with the cavity.

The cavity may include a sidewall, and the conducive wire may be bent once, with a bent part coming in contact with the sidewall and the other end coming in contact with the inner surface.

A stylus pen and a method for manufacturing the same according to the present disclosure has the following advantages.

According to at least one of the exemplary embodiments of the present disclosure, it is possible to accurately detect a contact point of a stylus pen by means of a terminal.

According to at least one of the exemplary embodiments of the present disclosure, it is also possible to provide a more intuitive interface to the user.

Further scope of applicability of the present disclosure will become apparent from the detailed description given hereinafter. However, it should be understood that the detailed description and specific examples, while indicating specific embodiments of the present disclosure, are given by way of illustration only, since various changes and modifications within the spirit and scope of the present disclosure will become apparent to those skilled in the art from this detailed description.

DETAILED DESCRIPTION OF THE EMBODIMENTS

Figure 1:
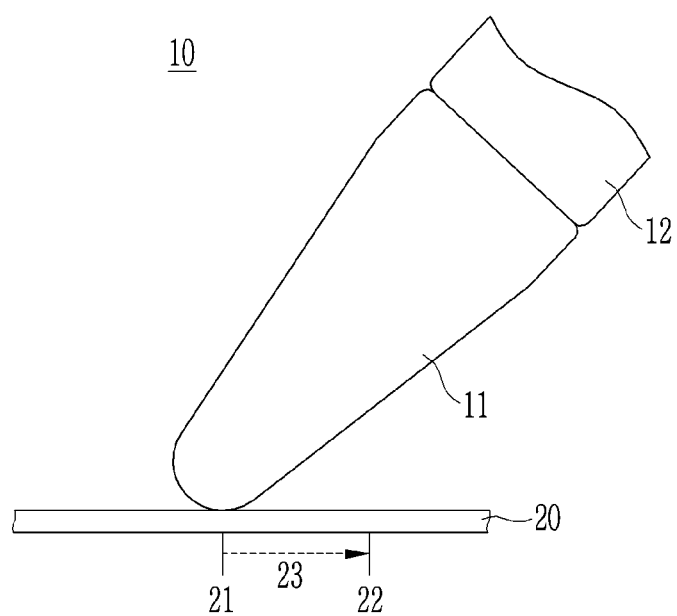
FIG. 1 to FIG. 3 are views showing a stylus pen according to the conventional art.
Figure 2:
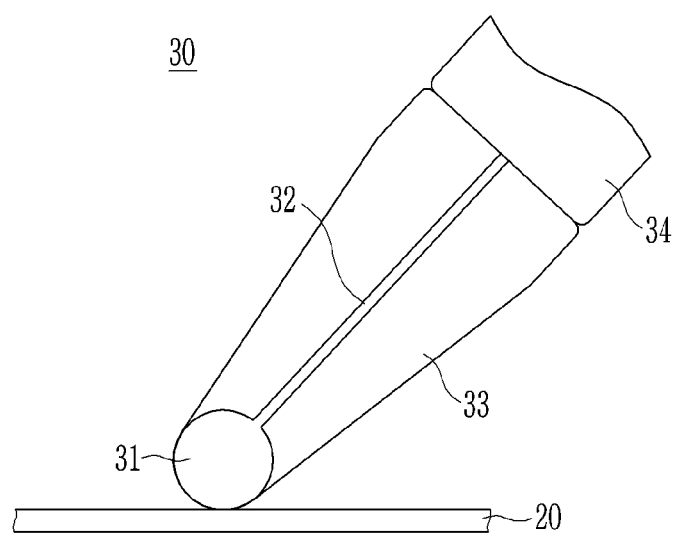
Figure 3:
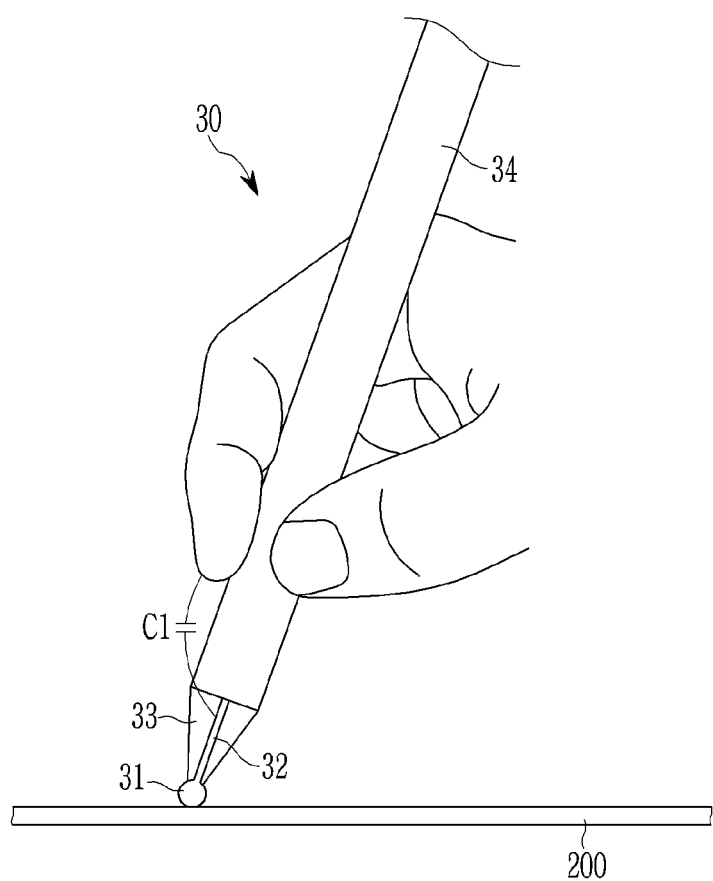

In the following detailed description, only certain exemplary embodiments of the present invention have been shown and described, simply by way of illustration. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements.

Figure 4:
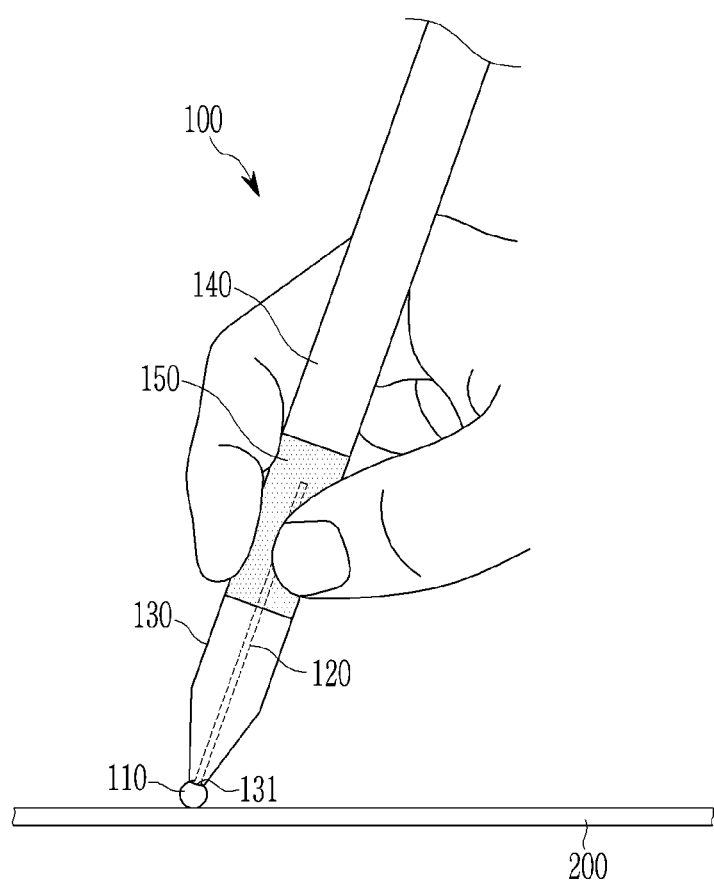
FIG. 4 is a view schematically showing a stylus pen according to an exemplary embodiment.

FIG. 4 is a view showing a stylus pen according to an exemplary embodiment.

As shown in FIG. 4, a stylus pen 100 according to an exemplary embodiment includes a stylus tip 110, a conductive member 120, a first body 130, a second body 140, and a guide portion 150.

The stylus tip 110 may have an overall spherical shape. Part of the stylus tip 110 may have a predetermined curvature (e.g., a hemisphere shape).

The stylus tip 110 may be positioned in a first opening 131 of the first body 130. At least part of the stylus tip 110 includes a conductive material. In this case, the stylus tip 110 preferably has a resistance of 10Ω or lower. Also, the diameter of the stylus tip 110 is preferably 0.1 mm to 3 mm, and particularly, 0.5 mm to 2 mm. At least part of the stylus tip 110 protrudes from the first opening 131, and at least part of it is inserted into the first body 130 through the first opening 131. For example, if the diameter of the stylus tip 110 is 2 mm, part of the stylus tip 110 is inserted into the first body 130 through the first opening 131 so that it protrudes 1.2 mm from the first opening 131.

The conductive member 120 is a wire with conductivity that is connected to the stylus tip 110, and may be positioned within the first body 130. The conductive member 120 includes a metallic material. The stylus tip 110 and the conductive member 120 may be insert-and-injection molded according to the manufacturing method to be described later in FIG. 15.

The conductive member 120 may be electrically connected to the guide portion 150 that is to be held by the user. For instance, the conductive member 120 may extend up to the guide portion 140 and make direct contact with the guide portion 150.

The conductive member 120 may be 20 mm or more in length. Also, the conductive member 120 may be 0.1 mm to 1 mm in diameter to minimize the effect of the tilt on sensitivity. The conductive member 120 may have the shape of a cylinder, a polygonal column, a column that is at least partially curved, an entasis, a frustum of a pyramid, a circular truncated cone, and so on, but is not limited to these shapes.

Part of the stylus tip 110 and the conductive member 120 may be disposed within the first body 130. In this case, the stylus tip 110 may be fixed to the first opening 131. Also, the first body 130 is attached to the guide portion 150.

The first body 130 may include a truncated cone and a column that extend from the first opening 131 and combine together. Although the first body 130 is illustrated as an integrated combination of a truncated cone portion and a column portion, the two portions may be separated from each other. The column portion may have the shape of a cylinder, a polygonal column, a column that is at least partially curved, an entasis, a frustum of a pyramid, a circular truncated cone, and so on, but is not limited to these shapes. The first body 130 may be made of a non-conductive material.

The guide portion 150 may include a conductive material. The guide portion 150 may be held by the user. A conductive part of the guide portion 150 may be externally exposed so as to be held directly by the user. Alternatively, the conductive part of the guide portion 150 may be surrounded by a non-conductive outer surface.

The guide portion 150 may be positioned 20 mm to 70 mm from the stylus tip 110. Preferably, the guide portion 150 to be held by the user may be 10 mm high, and may be positioned 20 mm to 40 mm from the stylus tip 110.

The outer surface of the guide portion 150 may have the shape of a cylinder, a polygonal column, a column that is at least partially curved, an entasis, a frustum of a pyramid, a circular truncated cone, and so on, but is not limited to these shapes.

The guide portion 150 may be electrically connected to the conductive member 120. The connection between the conductive member 120 and the guide portion 150 may be established in various ways. Then, the stylus tip 110, the conductive member 120, and the guide portion 150 may be electrically connected. When the stylus tip 110 approaches a sensing surface 200 while the guide portion 150 is being held by the user, an electric charge is transferred to the user from the stylus tip 110 through the conductive member 120 and the guide portion 150, thereby further increasing the touch sensitivity of the stylus tip 110.

The second body 140 is attached to the guide portion 150. The outer surface of the second body 140 may have the shape of a cylinder, a polygonal column, a column that is at least partially curved, and so on, but is not limited to these shapes. The second body 140 may be made of a non-conductive material.

Next, referring to FIG. 5, a stylus pen 100 according to an exemplary embodiment will be described in detail.

Figure 5:
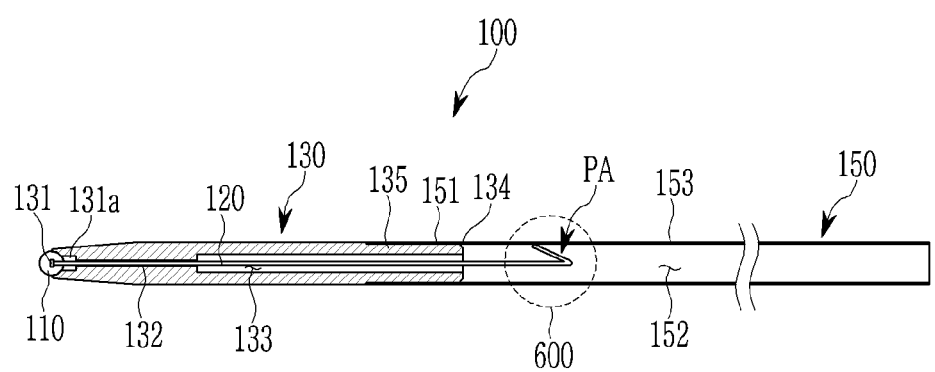
FIG. 5 is a view showing a detailed structure of a stylus pen according to a first exemplary embodiment.

FIG. 5 is a view showing a detailed structure of a stylus pen 100 according to a first exemplary embodiment.

As shown in FIG. 5, the stylus pen 100 includes a stylus tip 110, a conductive member 120, a first body 130, and a guide portion 150.

The stylus tip 110 is attached to the conductive member 120. At least a part (see TA of FIG. 16) of the conductive member 120 in the stylus tip 110 that is attached to the stylus tip 110 is deformed. For example, the width (or thickness or diameter) of at least a part of the conductive member 120 in the stylus tip 110 that is attached to the stylus tip 110 is larger than the width (or thickness or diameter) of the conductive member 120. Alternatively, at least a part of the conductive member 120 in the stylus tip 110 that is attached to the stylus tip 110 may be bent in the shape of a hook. This may prevent the conductive member 120 from being separated from the stylus tip 110. A part of the conductive member 120 may be deformed by press molding and various other molding methods.

Part of the stylus tip 110 may be positioned in a first opening 131 of the first body 130. The conductive member 120 may extend from the stylus tip 110 and be positioned in the first opening 131 and a cavity 133 of the first body 130.

The first opening 131 is positioned at one end of the first body 130, and a second opening 134 is positioned at the other end. The cavity 133 may be positioned between the first opening 131 and the second opening 132. The first body 130 is attached to the guide portion 150.

The guide portion 150 may be electrically connected to the conductive member 120. For instance, the guide portion 150 may make direct contact with the conductive member 120. Alternatively, the guide portion 150 and the conductive member 120 may be capacitively coupled even if the guide portion 150 does not make direct contact with the conductive member 120.

The conductive member 120 includes a metallic material. The conductive member 120 may be positioned in a cavity 152 of the guide portion 150. At least a part PA of the conductive member 120, positioned in the cavity 152 of the guide portion 150, is deformed. For example, at least a part PA of the conductive member 120 is bent within the cavity 152 of the guide portion 150. At least a part PA of the conductive member 120 will be described with reference to FIG. 6A to FIG. 6G.

FIG. 6A to FIG. 6G are views showing a structure of a part PA of the stylus pen according to the first exemplary embodiment.

Figure 6A:
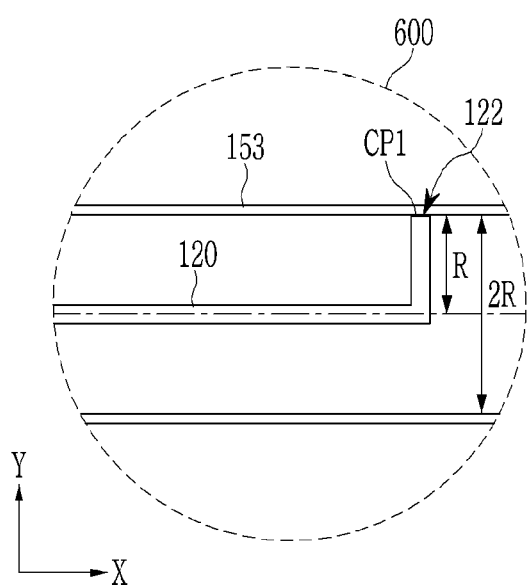
FIG. 6A to FIG. 6G are views showing a structure of a part of the stylus pen according to the first exemplary embodiment.

As shown in FIG. 6A, a part of the conductive member 120 extending in a first direction X is bent in a second direction Y perpendicular to the first direction. If the diameter of the cavity 152 is 2R, the length of the conductive member 120 bent in the second direction Y may be R or more. As the conductive member 120 is bent, one end 122 of the conductive member 120 comes in contact with an inner surface 153 of the cavity 152 at a contact point CP1.

Figure 6B:
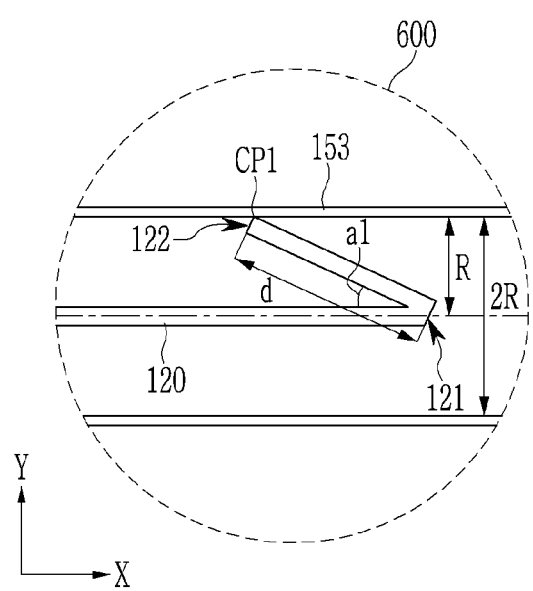

As shown in FIG. 6B, a part of the conductive member 120 extending in the first direction X is bent at a predetermined angle a1 with respect to the first direction. If the diameter of the cavity 152 is 2R, the length d of the conductive member 120 bent at the predetermined angle a1 may be R/sin a1 or more. As the conductive member 120 is bent, one end 122 of the conductive member 120 comes in contact with the inner surface 153 of the cavity 152 at the contact point CP1.

The conductive member 120 may have elasticity. The deformed part PA of the conductive member 120 may have resilience to recover its original shape (e.g., linear shape). A part PA of the conductive member 120 may make direct contact with the guide portion 150 since it gets straightened within the cavity 152 of the guide portion 150 by this resilience.

Although FIG. 6B illustrates that the conductive member 120 is bent at an acute angle, the conductive member 120 may be bent at an obtuse angle, in which case the length d of the conductive member 120 bent at the predetermined angle a1 may be R/cos a1 or more.

Figure 6C:
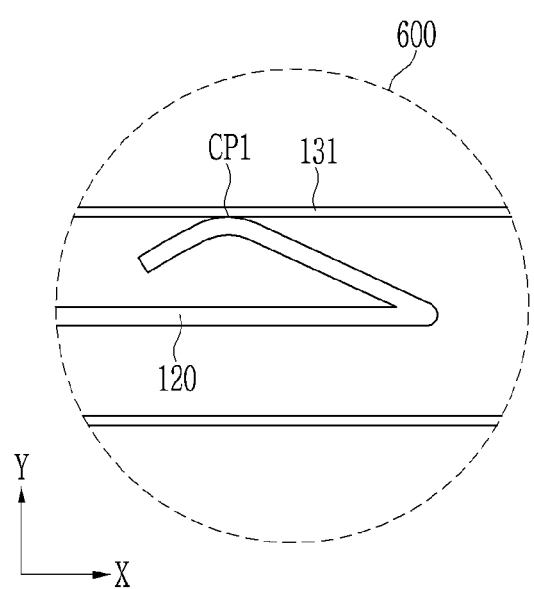

As shown in FIG. 6C, two parts of the conductive member 120 extending in the first direction X are bent in a curve. As the conductive member 120 is bent, one bent part 122 of the conductive member 120 comes in contact with the inner surface 153 of the cavity 152 at the contact point CP1.

Figure 6D:
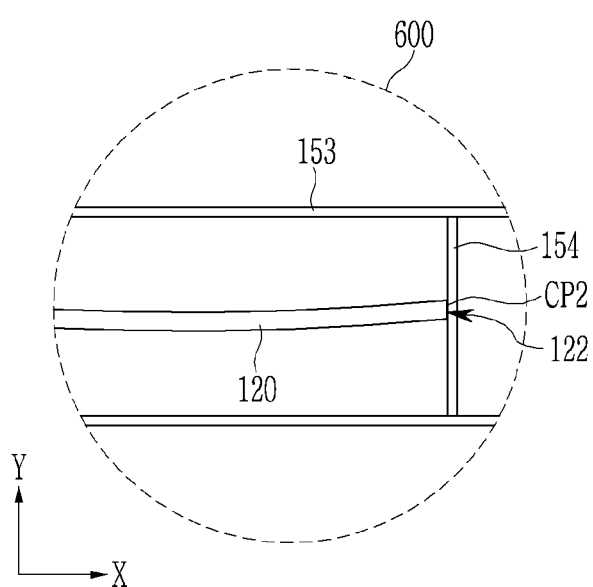

As shown in FIG. 6D, a sidewall 154 may be positioned within the cavity 152 of the guide portion 150. One end 122 of the conductive member 120 extending in the first direction X comes in contact with the sidewall 154 at a contact point CP2. The conductive member 120 may be bent within the cavity 152 due to the sidewall 154.

Figure 6E:
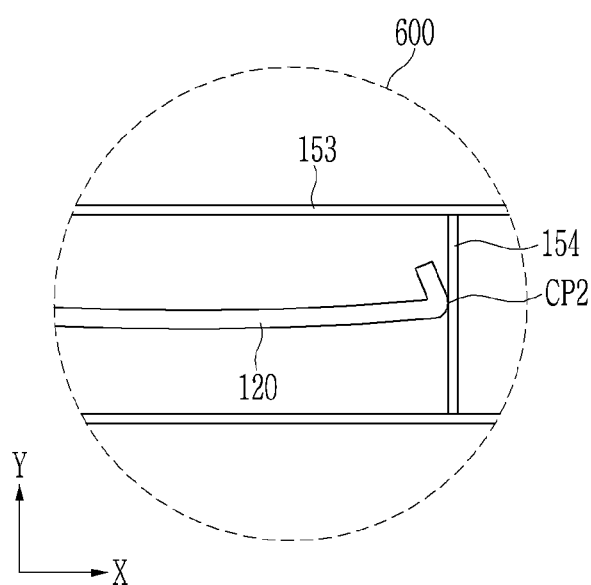

As shown in FIG. 6E, the sidewall 154 may be positioned within the cavity 152 of the guide portion 150. As the conductive member 120 extending in the first direction X is bent, the bent part comes in contact with the sidewall 154 at the contact point CP2. The conductive member 120 may be bent within the cavity 152 due to the sidewall 154.

Figure 6F:
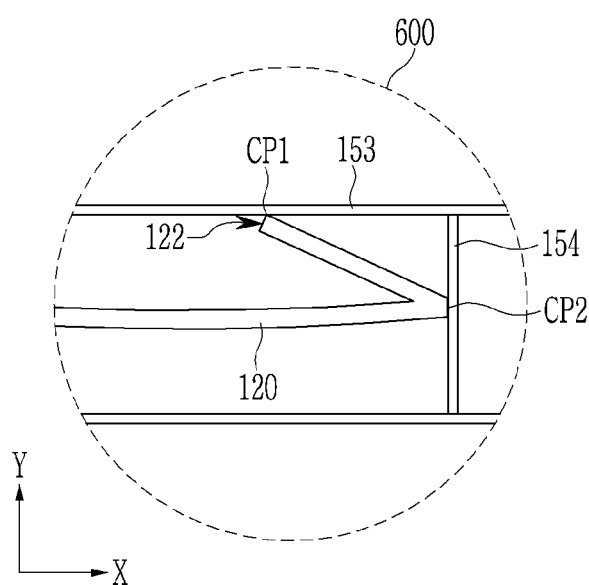

As shown in FIG. 6F, the sidewall 154 may be positioned within the cavity 152 of the guide portion 150. As the conductive member 120 extending in the first direction X is bent, the bent part comes in contact with the sidewall 154 at the contact point CP2, and one end 122 comes in contact with the inner surface 153 of the cavity 152 at the contact point CP1. The conductive member 120 may be bent within the cavity 152 due to the sidewall 154.

Figure 6G:
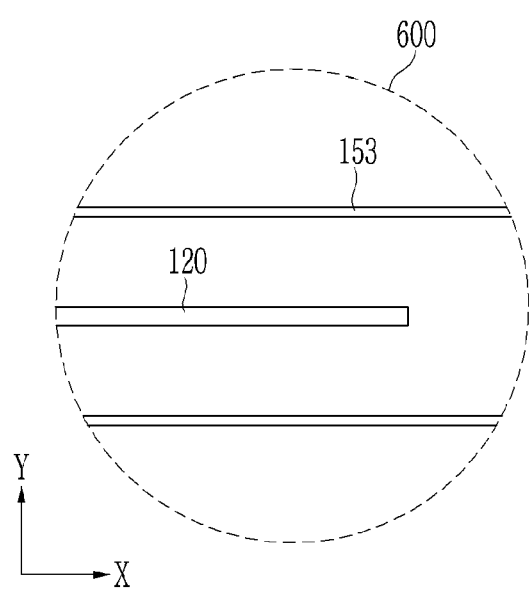

As shown in FIG. 6G, a part of the conductive member 120 within the cavity 152, extending in the first direction X, is separated from the inner surface 153 of the cavity 152. In this case, the conductive member 120 and the cavity 152 may be capacitively coupled by using the air in the cavity 152 as the dielectric, even if the conductive member 120 does not make direct contact with the cavity 152. Although not shown, a part PA of the conductive member 120 extending in the first direction X may be bent while separated from the inner surface 153.

As described with reference to FIG. 6A to FIG. 6G, the conductive member 120 may make direct contact with the guide portion 150 within the cavity 152 in various shapes, but the shape of the conductive member 120 is not limited to this description.

Next, a method for manufacturing the above-described stylus pen 100 will be described with reference to FIGS. 7 to 9.

Figure 7:
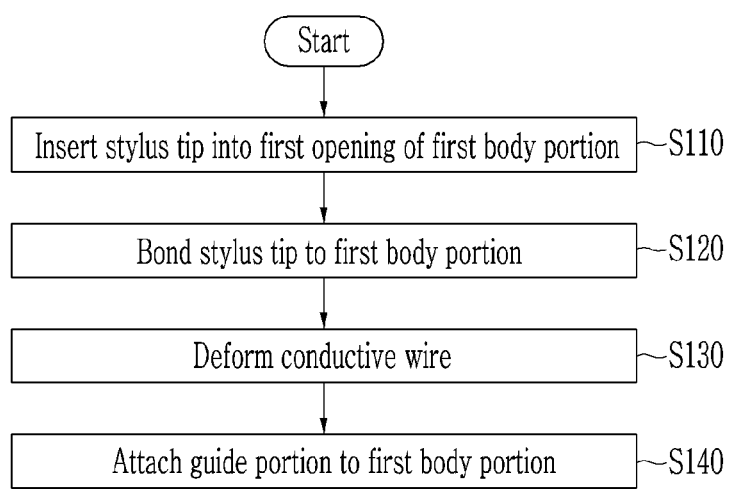
FIG. 7 is a flowchart of a method for manufacturing the stylus pen according to the first exemplary embodiment.
Figure 8A:
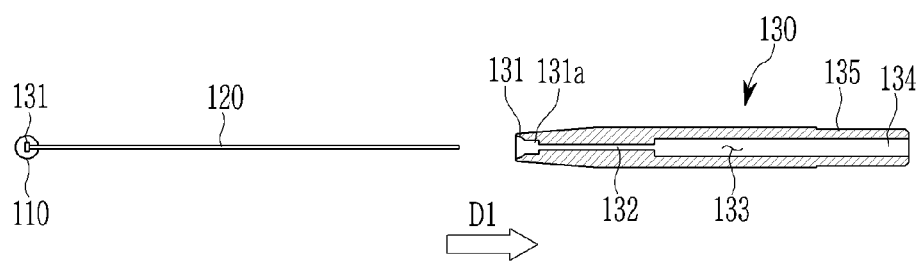
FIG. 8A, FIG. 8B, FIG. 9A and FIG. 9B are views showing the stylus pen manufactured according to the method of FIG. 7.
Figure 8B:
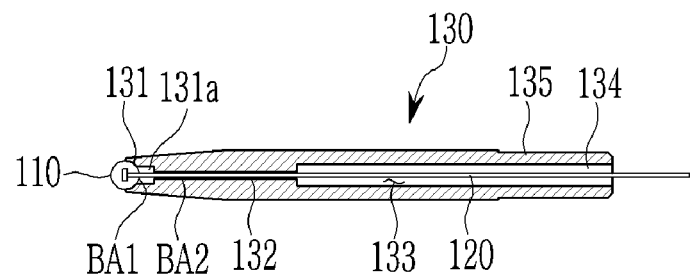
Figure 9A:
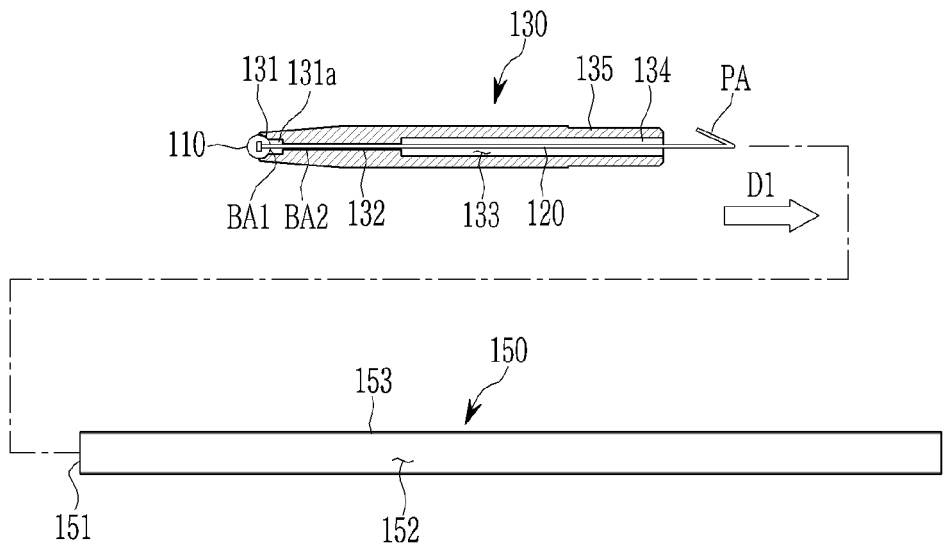
Figure 9B:
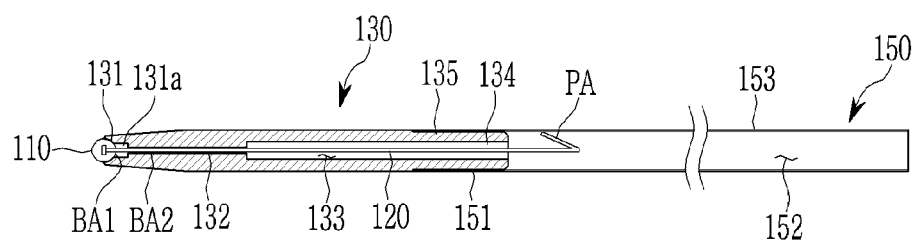

FIG. 7 is a flowchart of a method for manufacturing the stylus pen 100 according to the first exemplary embodiment, and FIG. 8 and FIG. 9 are views showing the stylus pen 100 manufactured according to the method of FIG. 7.

Referring to FIG. 7, a stylus tip 110 and a conductive member 120 are inserted into a first opening 131 of a first body 130 (S110), and the stylus tip 110 is bonded to the first body 130 (S120). The steps S110 and S120 will be described with reference to FIG. 8.

As shown in (a) of FIG. 8, the first body 130 includes a first opening 131, a through hole 132, a cavity 133, a second opening 134, and a combining portion 135. The conductive member 120 connected to the stylus tip 110 may be inserted into the first opening 131 in a first direction D1. The conductive member 120 may be inserted into the first body 130 so that the stylus tip 110 makes contact with the first opening 131.

Then, as shown in (b) of FIG. 8, the conductive member 120 may be positioned in the through hole 132, the cavity 133, and the second opening 134. The conductive member 120 may be bonded to at least parts BA1 and BA2 of the through hole 132 and the cavity 133 by applying a bonding agent or the like to a bonding portion 131a and injecting the bonding agent or the like through the cavity 133.

Next, an end PA of the conductive member 120 is deformed (S130), and the guide portion 150 is inserted into the second opening 134 of the first body 130 (S140). The steps S130 and S140 will be described with reference to FIG. 9.

As shown in (a) of FIG. 9, one end PA of the conductive member 120 may be deformed while the conductive member 120 is inserted in the first body 130. For example, the end PA may be bent in the shapes shown in FIG. 6A to FIG. 6F. The end PA of the conductive member 120 may be deformed by various molding methods.

While one part of the conductive member 120 is bent once in the above description, the number of bends of the conductive member 120 is not limited. At least a part of the conductive member 120 attached to the guide portion 150 may be bent so as to make direct contact with the guide portion 150.

Moreover, the end PA of the conductive member 120 may be cut to a predetermined length. For example, the end PA may be cut to a predetermined length so as to not make direct contact with the cavity 152 as in FIG. 6G, thereby adjusting the length of the conductive member 120.

As shown in (a) of FIG. 9 and (b) of FIG. 9, the first body 130 may be attached to the guide portion 150 along the first direction D1. For example, the combining portion 135 may be inserted into the cavity 152 through a first opening 151 of the guide portion 150.

In the stylus pen 100 manufactured according to the above method, the stylus tip 110, the conductive member 120, and the guide portion 150 are electrically connected. The user may use the stylus pen 100 by holding the guide portion 150 which is externally exposed. Moreover, the user may hold the guide portion 150 with ease since the guide portion 150 is extended. An electrical charge transferred by touch electrodes in response to a driving signal may be in sync with the user's hand in the ground state via the stylus pen 100. Accordingly, the stylus pen 100 according to the exemplary embodiment may provide improved touch sensitivity to the user.

In addition, the stylus pen 100 may improve the tilt offset of the stylus pen 100 since the conductive member 120 is smaller in diameter than the stylus tip 110.

Next, referring to FIG. 10 to FIG. 13, stylus pens 102, 400, 402, and 404 according to exemplary embodiments will be described.

FIGS. 10 to 13 are views schematically showing stylus pens according to second to fifth exemplary embodiments.

Figure 10:
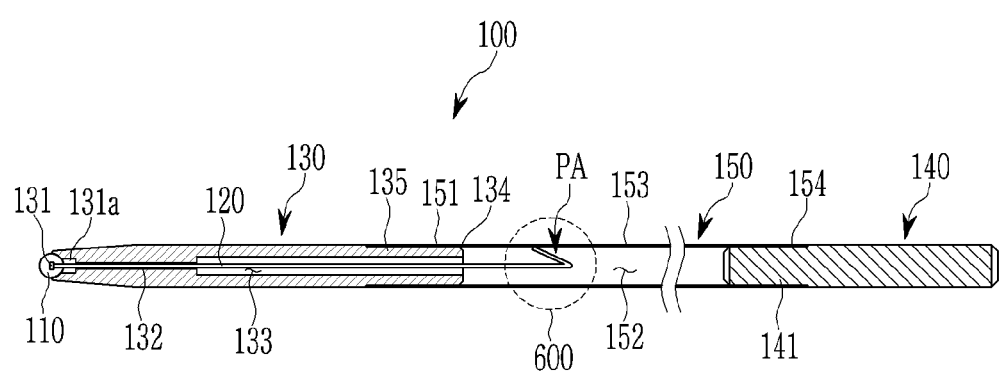
FIG. 10 is a view schematically showing a stylus pen according to a second exemplary embodiment.

First of all, referring to FIG. 10, the stylus pen 102 according to the second exemplary embodiment further includes a second body 140, as compared to the stylus pen 100 of the first exemplary embodiment.

The second body 140 is attached to the guide portion 150. The outer surface of the second body 140 may have the shape of a cylinder, a polygonal column, a column that is at least partially curved, and so on, but is not limited to these shapes. The second body 140 may be made of a non-conductive material. A combining portion 141 of the second body 140 is inserted into the cavity 152 through the second opening 154 of the guide portion 150.

Next, referring to FIG. 11, the stylus pen 400 according to the third exemplary embodiment will be described. The stylus pen 400 includes a stylus tip 410, a conductive member 420, a first body 430, a second body 440, and a guide portion 450.

The stylus tip 410 is attached to the conductive member 420. At least a part of the conductive member 420 in the stylus tip 410 that is attached to the stylus tip 410 is deformed. For example, the width (or thickness or diameter) of at least a part of the conductive member 420 in the stylus tip 410 that is attached to the stylus tip 410 is larger than the width (or thickness or diameter) of the conductive member 420. Alternatively, at least a part of the conductive member 420 in the stylus tip 410 that is attached to the stylus tip 410 may be bent in the shape of a hook. This may prevent the conductive member 420 from being separated from the stylus tip 410. A part of the conductive member 420 may be deformed by press molding and various other molding methods.

Part of the stylus tip 410 may be positioned in a first opening 431 of the first body 430. The conductive member 420 may extend from the stylus tip 410 and be positioned in the first opening 431 and a cavity 433 of the first body 430.

The first opening 431 is positioned at one end of the first body 430, and a second opening 432 is positioned at the other end. The cavity 433 may be positioned between the first opening 431 and the second opening 432. The first body 430 is attached to the guide portion 450.

The guide portion 450 may be electrically connected to the conductive member 420. For instance, the guide portion 450 may make direct contact with the conductive member 420.

The conductive member 420 may be positioned in a cavity 452 of the guide portion 450. At least a part PA of the conductive member 420, positioned in the cavity 452 of the guide portion 450, is deformed. For example, at least a part PA of the conductive member 420 is bent.

The conductive member 420 includes a metallic material with elasticity. The deformed part PA of the conductive member 420 may have resilience to recover its original shape (e.g., a linear shape). The part PA of the conductive member 420 may make direct contact with the guide portion 450 since it gets straightened within the cavity 452 of the guide portion 450 by this resilience.

The guide portion 450 is attached to the second body 440. The guide portion 450 may be attached to the second body 440 at an opening 441 of the second body 440. For example, a combining portion 454 of the guide portion 450 may be inserted into and attached to the opening of the second body 440.

Figure 12:
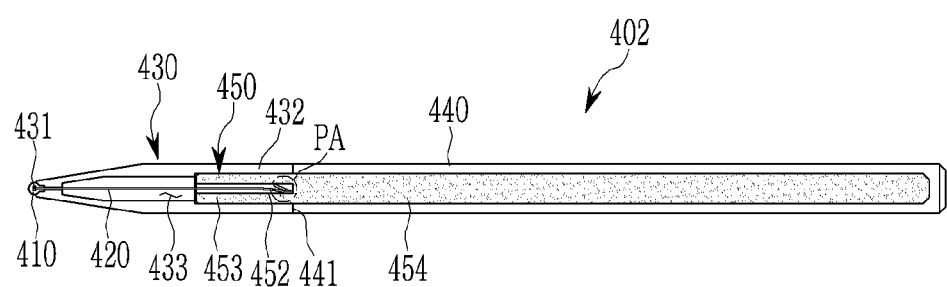
FIG. 12 is a view schematically showing a stylus pen according to a fourth exemplary embodiment.

As shown in FIG. 12, the stylus pen 402 according to another exemplary embodiment of the present invention includes a stylus tip 410, a conductive member 420, a first body 430, a guide portion 450, and a second body 440.

Figure 11:
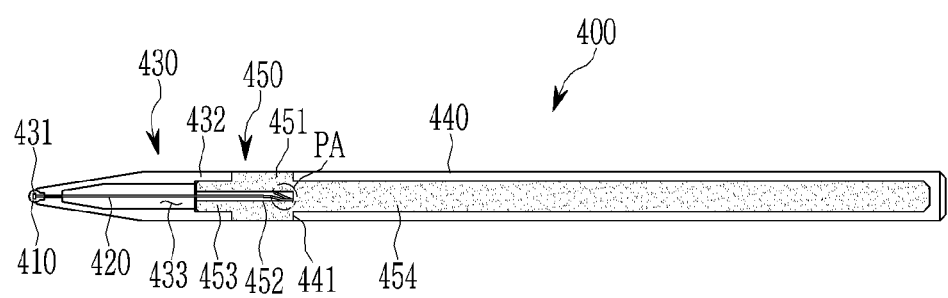
FIG. 11 is a view schematically showing a stylus pen according to a third exemplary embodiment.

The stylus pen 402 of FIG. 12 is mostly similar to the stylus pen 400 of FIG. 11, but the guide portion 450 is fully inserted into the first body 430 and the second body 440, as compared to the stylus pen 400. Thus, this difference alone will be described.

The guide portion 450 may be electrically connected to the conductive member 420. The connection between the conductive member 420 and the guide portion 450 may be established in various ways.

The guide portion 450 is fully inserted into the first body 430 and the second body 440. The outer surface of the guide portion 450 is covered by the first body 430 and the second body 440. In FIG. 12, the second opening 432 of the first body 430 extends further than the second opening 432 of FIG. 11 and surrounds the guide portion 450.

In the case of the stylus pen 402 according to the present exemplary embodiment, if the user holds a part of the first body 430 or the second body 440, the guide portion 450 and the user's hand may be capacitively coupled via that part of the first body 430 or the second body 440. Thus, an electrical charge transferred by touch electrodes in response to a driving signal may be in sync with the user's hand. Accordingly, the stylus pen 402 according to the exemplary embodiment may provide improved touch sensitivity to the user.

Figure 13:
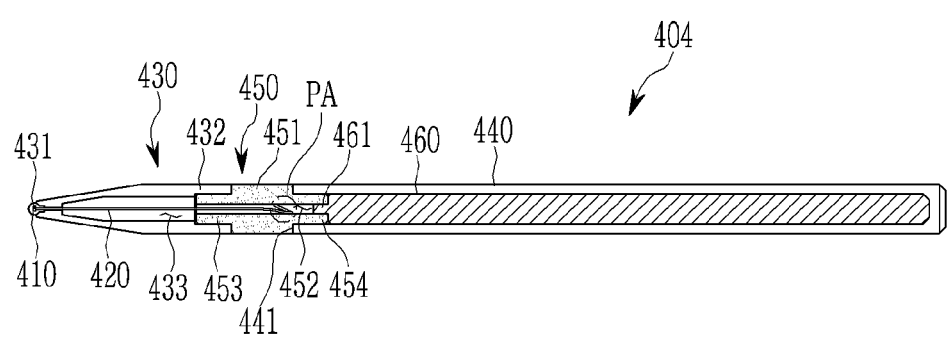
FIG. 13 is a view schematically showing a stylus pen according to a fifth exemplary embodiment.

As shown in FIG. 13, the stylus pen 404 according to yet another exemplary embodiment of the present invention includes a stylus tip 410, a conductive member 420, a first body 430, a second body 440, a guide portion 450, and a guide extension 460.

The stylus pen 404 of FIG. 13 is mostly similar to the stylus pen 400 of FIG. 11, but further includes the guide extension 460 attached to the guide portion 450. Thus, this difference alone will be described.

The guide extension 460 is attached to the guide portion 450. The outer surface of the guide extension 460 may have the shape of a cylinder, a polygonal column, a column that is at least partially curved, and so on, but is not limited to these shapes. The guide extension 460 may be made of a conductive material, which may be the same material as that of the guide portion 450 or a different material than that of the guide portion 450.

Moreover, the guide extension 460 may be formed from a conductor that extends along the length of the stylus pen 404. The shape of the conductor is not limited.

The guide extension 460 includes a combining portion 461. A cavity 452 of the guide portion 450 is made through the guide portion 450. The combining portion 461 is inserted into the cavity 452 of the guide portion 450. Accordingly, the guide extension 460 is electrically connected to the guide portion 450.

Although not shown in FIG. 13, the combining portion 461 may make direct contact with a part of the conductive member 420 within the cavity 452. Accordingly, the guide extension 460 may be electrically connected to the stylus tip 410 and the conductive member 120.

The user may use the stylus pen 404 by holding a grip part 451 of the guide portion 150 which is externally exposed. An electrical charge transferred by touch electrodes in response to a driving signal may be in sync with the user's hand in the ground state via the stylus pen 404. Moreover, the guide extension 460 attached to the guide portion 450 extends within the second body 440. As such, if the user holds the second body 440, the guide extension 460 and the user's hand are capacitively coupled via the second body 440. Thus, an electrical charge transferred by touch electrodes in response to a driving signal may be in sync with the user's hand. Accordingly, the stylus pen 402 according to the exemplary embodiment may provide improved touch sensitivity to the user.

In addition, the stylus pen 404 may improve the tilt offset compared to that of the stylus pen 400 since the conductive member 420 is smaller in diameter than the stylus tip 410.

Next, a method for manufacturing the above-described stylus tip 110 and the conductive member 120 attached to it will be further described with reference to FIGS. 14 to 20. The steps for manufacturing the stylus tip may be performed prior to the step S110.

Figure 14:
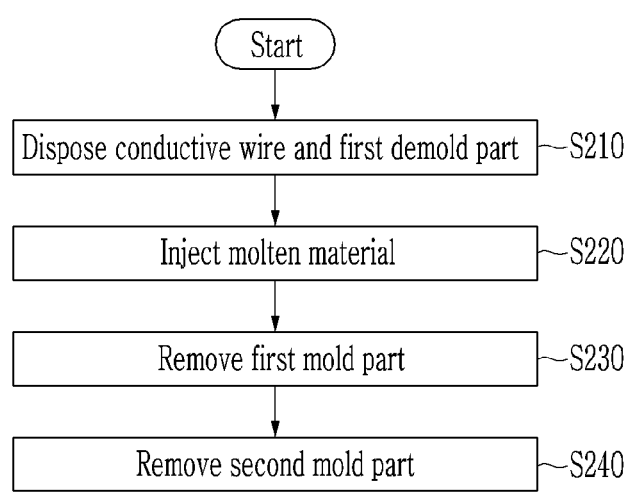
FIG. 14 is a view showing a method for manufacturing part of a stylus pen according to an exemplary embodiment.

FIG. 14 is a view showing a method for manufacturing part of a stylus pen according to an exemplary embodiment, and FIG. 15 to FIG. 20 are views showing part of the stylus pen manufactured according to the method of FIG. 14.

Referring to FIG. 14, first of all, a conductive member 120 and a first demold part 340 are disposed in a molding space (312 and 322) of a manufacturing apparatus 300 (S210).

Figure 15:
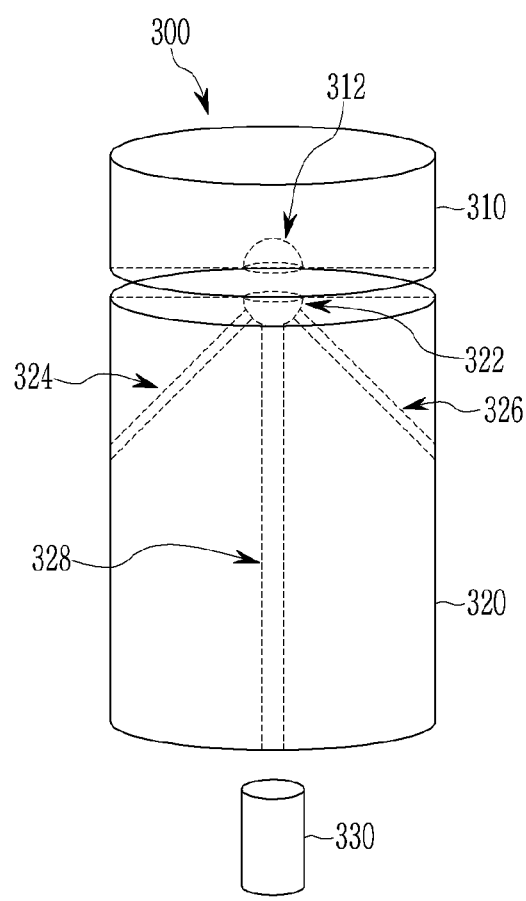
FIG. 15 to FIG. 20 are views showing part of the stylus pen manufactured according to the method of FIG. 14.

As shown in FIG. 15, the manufacturing apparatus 300 includes a first mold part 310 and a second mold part 320. A first cavity 312 is formed inside the first mold part 310, and a second cavity 322 is formed inside the second mold part 320. When the first mold part 310 and the second mold part 320 are joined, the first cavity 312 and the second cavity 322 may form the molding space (312 and 322). The molding space (312 and 322) may correspond in shape to the stylus tip 110, and is illustrated to have an overall spherical shape in the following figures.

An inlet 326 for injecting a molten material 350, a first insertion opening 328 for inserting the conductive member 120, and a second insertion opening 324 for inserting the first demold part 340 are formed in the second mold part 320.

Figure 16:
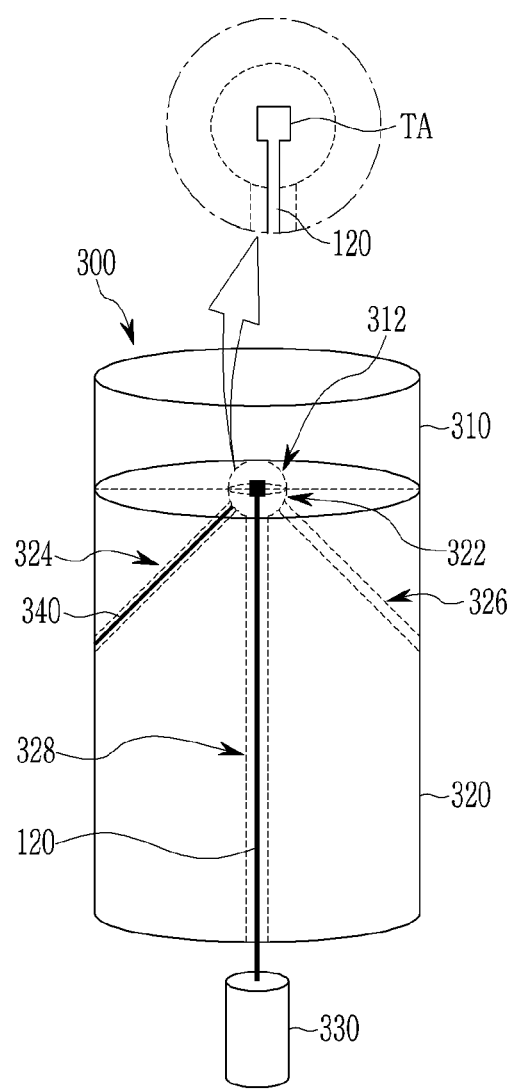

As shown in FIG. 16, in the step S210, the conductive member 120 is inserted through the first insertion opening 328, and one end thereof may be positioned within the molding space (312 and 322). In this case, a part TA of the conductive member 120 positioned within the molding space (312 and 322) may be deformed in shape. The part TA of the conductive member 120 may be deformed by press molding and various other molding methods. Also, the other end of the conductive member 120 may be supported by a second demold part 330.

The first demold part 340 may be inserted through the second insertion opening 324 and positioned at the boundary of the molding space (312 and 322) and the second insertion opening 324. The first demold part 340 may prevent the molten material 350 from spilling out of the molding space (312 and 322) through the second insertion opening 324.

The molten material 350 is injected (S220). The molten material 350 includes a molten metal, a resin composition, etc. In this case, the molten metal and the resin composition may be a molten material 350 that is formed of a material that becomes conductive after being cooled.

Figure 17:
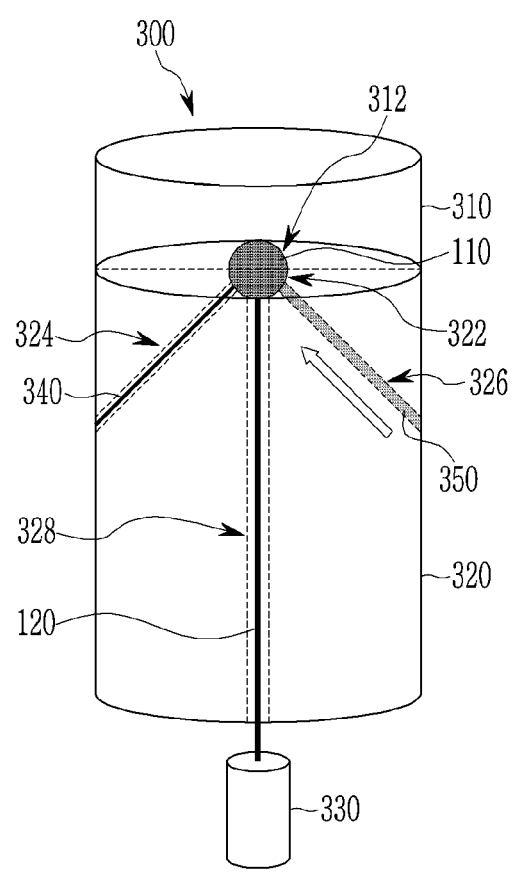

As shown in FIG. 17, the molten material 350 may be injected through the inlet 326 and fill the molding space (312 and 322). As the molten material 350 injected into the molding space (312 and 322) is cooled, the molten material 350 may solidify and fuse onto the conductive member 120 within the molding space (312 and 322).

Figure 18:
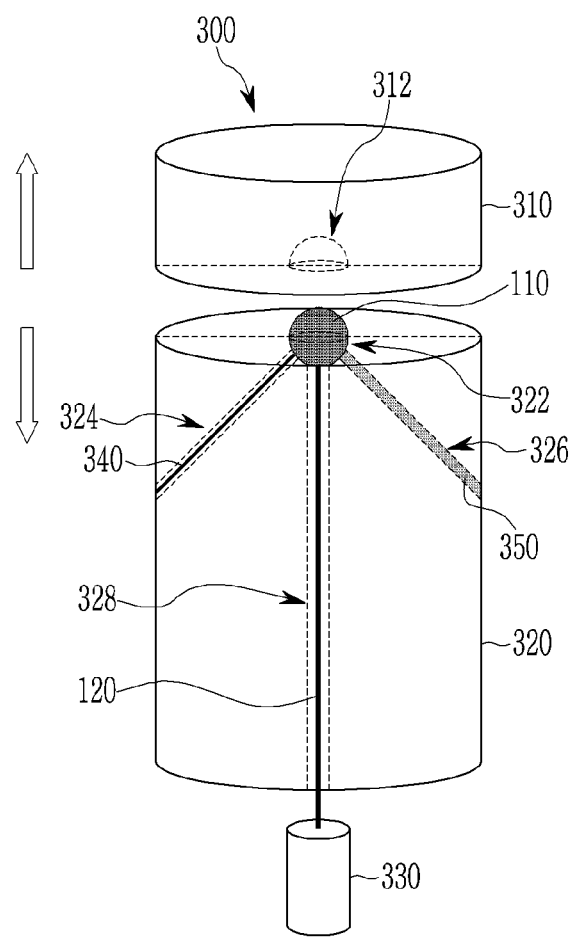

When cooling is complete, the first mold part 310 is removed (S230). As shown in FIG. 18, the first mold part 310 and the second mold part 320 may be moved in opposite directions, or the first mold part 310 may be removed by separating it from the second mold part 320.

Figure 19:
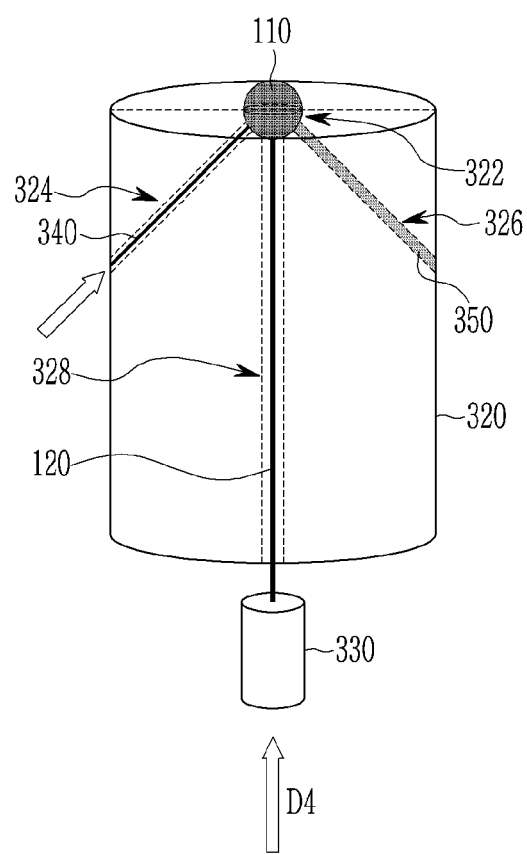
Figure 20:
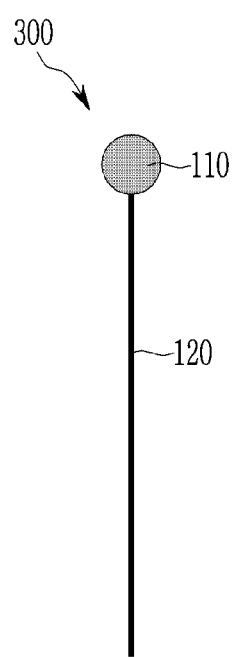

Next, the second mold part 320 is removed (S240). If a force is applied to the first demold part 340 in a direction D3 and a force is applied to the second demold part 330 in a direction D4, as shown in FIG. 19, the stylus tip 110 may be demolded from the second cavity 322 as shown in FIG. 20. That is, the stylus tip 110 applies pressure to the first demold part 340 and the second demold part 330 in the direction in which it is separated from the molding space (312 and 322), thereby demolding the stylus tip 110. Surface treatment may be performed on the surface of the stylus tip 110.

In the injection molding method described above, the stylus tip 110 and the conductive member 120 may combine in such a way that the conductive member 120 is inserted into the stylus tip 110. The combined body of the stylus tip 110 and the conductive member 120, which is formed by the above injection molding method, may have improved durability, reducing concern about separation or damage due to external impact. Another advantage is that mass production is possible at low production costs, as compared with other methods of combining the stylus tip 110 and the conductive member 120.

The foregoing detailed description should not be construed as restrictive in all aspects but is to be considered as illustrative. The scope should be determined by reasonable interpretation of the appended claims, and all changes that come within the equivalent scope are included in the scope.

What is claimed is:

1. A stylus pen comprising:
    a first body with a first opening at one end and a second opening at the other end;
    a stylus tip, at least part of which protrudes from the first opening and has conductivity;
    a guide portion attached to the second opening and comprising a cavity; and
    a conductive member that extends through the cavity within the first body, with one end attached to the stylus tip, and that is electrically connected to the cavity,
    wherein the guide portion has a conductive part which is externally exposed to directly contact with an external ground, and
    wherein at least a part of the conductive member is bent within the cavity, and an end of the conductive member that is bent comes in direct contact with an inner surface of the cavity.

2. The stylus pen of claim 1, wherein the conductive member comes in contact with an inner surface of the cavity.

3. The stylus pen of claim 1, wherein the cavity comprises a sidewall, and the conductive member comes in contact with the sidewall.

4. The stylus pen of claim 1, wherein the at least a part of the conductive member bent within the cavity comes in contact with the sidewall.

5. The stylus pen of claim 1, wherein the conductive member is bent at an acute angle, and a length of the part bent at the acute angle is $R/\sin a1$ or more, where R is a radius of the cavity and $a1$ is the acute angle.

6. The stylus pen of claim 1, wherein the conductive member is bent at an obtuse angle, and a length of the part bent at the obtuse angle is $R/\cos a1$ or more, where R is a radius of the cavity and $a1$ is the obtuse angle.

7. The stylus pen of claim 1, further comprising a second body that is attached to the guide portion on the opposite side of one end to which the second opening is attached.

8. The stylus pen of claim 7, wherein the guide portion further comprises a first combining portion attached to the first body, a grip part that is externally exposed, and a second combining portion attached to the second body.

9. The stylus pen of claim 8, wherein the second combining portion extends within the second body.

10. The stylus pen of claim 8, further comprising a guide extension attached to the cavity, wherein the second body is attached to the guide portion and the guide extension, and the guide extension extends within the second body.

11. The stylus pen of claim 7, wherein the guide portion is not externally exposed because of the first body and the second body.

12. The stylus pen of claim 1, wherein the conductive member comprises a metallic material with elasticity.

13. The stylus pen of claim 1, wherein the conductive member is 1 mm or less in diameter.

14. The stylus pen of claim 1, wherein a diameter of the stylus tip is 0.5 mm to 3 mm, and a diameter of the first opening is smaller than the diameter of the stylus tip.

15. The stylus pen of claim 1, wherein a part of the conductive member attached to the stylus tip has a different shape than the other part of the conductive member so as to keep the conductive member from being separated from the stylus tip.

* * * * *